(12) United States Patent
Do et al.

(10) Patent No.: US 9,313,465 B2
(45) Date of Patent: Apr. 12, 2016

(54) LEARNED TRANSFORM AND COMPRESSIVE SENSING FOR VIDEO CODING

(75) Inventors: Thong Do, Beltsville, MD (US); Xiaoan Lu, Princeton, NJ (US); Joel Sole, La Jolla, CA (US)

(73) Assignee: THOMSON LICENSING, Issy les Moulineaux ( * ) Notice: Subject to any disclaimer, the term of this patent is extended or adjusted under 35 U.S.C. 154(b) by 582 days.

(21) Appl. No.: 13/700,882

(22) PCT Filed: Jun. 6, 2011

(86) PCT No.: PCT/US2011/039218
§ 371 (c)(1),
(2), (4) Date: Nov. 29, 2012

(87) PCT Pub. No.: WO2011/156250
PCT Pub. Date: Dec. 15, 2011

(65) Prior Publication Data
US 2013/0089151 A1 Apr. 11, 2013

Related U.S. Application Data

(60) Provisional application No. 61/352,177, filed on Jun. 7, 2010.

(51) Int. Cl.
*H04N 19/00* (2014.01)
*H04N 19/60* (2014.01)
(Continued)

(52) U.S. Cl.
CPC .............. *H04N 7/30* (2013.01); *H04N 19/122* (2014.11); *H04N 19/134* (2014.11);
(Continued)

(58) Field of Classification Search
CPC ....... H04N 7/50; H04N 7/30; H04N 7/26244; H04N 7/2625; H04N 7/26127
See application file for complete search history.

(56) References Cited

U.S. PATENT DOCUMENTS

| 8,396,310 B1 * | 3/2013 | Kadambe et al. .............. 382/239 |
| 8,483,492 B2 * | 7/2013 | Baraniuk et al. .............. 382/232 |
| 8,520,736 B2 * | 8/2013 | Topiwala ................. 375/240.16 |

FOREIGN PATENT DOCUMENTS

WO WO2011087908 7/2011

OTHER PUBLICATIONS

Over Zhang et al. A Novel Image/Video Coding Method Based on Compressed Sensing Theory, ICASSP 2008.*
(Continued)

*Primary Examiner* — Jay Patel
*Assistant Examiner* — Frank Huang
(74) *Attorney, Agent, or Firm* — Robert D. Shedd; Julia Tanase

(57) ABSTRACT

Methods and apparatus are provided for video encoding and decoding with learned transform and compressive sensing. An apparatus includes a video encoder for encoding an image block in a picture by determining from a training data set an adaptive transform for transforming a signal capable of representing the image block into zero coefficients and non-zero coefficients, reconstructing the image block in a pixel domain to obtain a reconstructed version of the image block by minimizing a number of the non-zero coefficients in a transform domain corresponding to the transform responsive to information of the signal and a prediction of the image block, and incorporating the reconstructed version of the image block into a coding mode that is absent from any video coding standards and video coding recommendations.

45 Claims, 11 Drawing Sheets

(51) Int. Cl.
*H04N 19/176* (2014.01)
*H04N 19/134* (2014.01)
*H04N 19/122* (2014.01)
*H04N 19/61* (2014.01)
*H04N 19/86* (2014.01)
*H04N 19/97* (2014.01)

(52) U.S. Cl.
CPC ............ *H04N 19/176* (2014.11); *H04N 19/60* (2014.11); *H04N 19/61* (2014.11); *H04N 19/86* (2014.11); *H04N 19/97* (2014.11)

(56) References Cited

OTHER PUBLICATIONS

Reeves et al. "Differences between observation and sampling error in sparse signal reconstruction", Proc. 2007 IEEE Workshop Statistical Signal Process. (SSP 2007), pp. 690-694 2007.*

Aharon et al "K-SVD: An algorithm for designing overcomplete dictionaries for sparse representation," IEEE Trans. Signal Process., vol. 54, No. 11, pp. 4311-4322, Nov. 2006.*

Aharon et al., "K-SVD: An Algorithm for Designing Overcomplete Disctionaries for Sparse Representation", IEEE Transactionson Signal Processing, vol. 54, No. 11. Nov. 1, 2006, pp. 4311-4322.

Do et al., "Compressive Sensing with Adaptive Pixel Domain Reconstruction for Block-Based Video Coding", 17th IEEE International Conference on Image Processing (ICIP), Sep. 26, 2010, pp. 3377-3380.

Elad et al., "On the Role of Sparse and Redundant Representations in Image Processing", Proceedings of the IEEE, vol. 98, No. 6, May 19, 2010.

Zhang et al., "A Novel Image/Video Coding Method Based on Compressed Sensing Theory". IEEE International Conference on Acoustics, Speech and Signal Processing, ICASSP 2008, Mar. 31, 2008, pp. 1361-1364.

Baraniuk, "Compressive Sensing," Lecture Notes. IEEE Signal Processing Magazine [118], Jul. 2007, 4 pages.

Search Report dated Aug. 16, 2012.

* cited by examiner

LEARNED TRANSFORM AND COMPRESSIVE SENSING FOR VIDEO CODING

CROSS-REFERENCE TO RELATED APPLICATIONS

This application claims the benefit, under 35 U.S.C. §365 of International Application PCT/US2011/039218, filed Jun. 6, 2011, which was published in accordance with PCT Article 21(2) on Dec. 15, 2011 in English and which claims the benefit of U.S. provisional patent application No. 61/352,177, filed Jun. 7, 2010.

TECHNICAL FIELD

The present principles relate generally to video encoding and decoding and, more particularly, to methods and apparatus for encoding and decoding with learned transform and compressive sensing.

BACKGROUND

In recent years there has been a growing interest in the study of sparse representation of signals. Using an overcomplete dictionary that includes prototype signal-atoms, signals are described by sparse linear combinations of these atoms. Applications that use sparse representation are many and include compression, regularization in inverse problems, feature extraction, and so forth. Recent activity in this field has concentrated mainly on the study of pursuit algorithms that decompose signals with respect to a given dictionary. Designing dictionaries to better fit the above model can be done by either selecting one from a pre-specified set of linear transforms or adapting the dictionary to a set of training signals. We are interested in an application that uses sparse representation for video compression.

Introduction of Compressive Sensing (CS) Framework:

Compressive sensing (also referred to as compressive sampling and compressed sensing) is a technique for acquiring and reconstructing a signal in consideration of the prior knowledge that the signal is sparse or compressible.

Supposing x is a length-N signal, x is said to be K-sparse (or compressible) if x can be well approximated using K<<N coefficients under some linear transform $\Psi$ (e.g., the discrete cosine transform (DCT) or the discrete wavelet transform (DWT)) as follows:

$$x = \Psi\alpha, \quad (1)$$

where $\Psi$ is the sparsifying transform, $\alpha$ is the transform coefficient vector, and only K coefficients in $\alpha$ are non-zeroes. Turning to FIG. 1, a representation of a sparse signal is indicated generally by the reference numeral 100. The representation 100 involves a length-N signal x, a sparsifying transform $\Psi$, and a transform coefficient vector $\alpha$.

According to the Compressive Sensing (CS) theory applied in a first prior art approach, such a signal can be acquired through the incoherent linear projection as follows:

$$y = \Phi x, \quad (2)$$

where y is the measurement vector with M entries, and $\Phi$ represents an M×N incoherent sensing matrix. Turning to FIG. 2, a method for measurement acquisition in compressive sensing is indicated generally by the reference numeral 200. The method 200 involves a length-N signal x, a measurement vector with M entries y, and an M×N incoherent sensing matrix $\Phi$.

The CS framework asserts that x can be faithfully recovered from only M~K log N measurements by solving the following optimization problem:

$$\alpha^* = \min |\alpha|_1 \text{ such that } y = \Phi x = \Phi\Psi\alpha^*, \quad (3)$$

and the input signal can be approximated by $x^* = \Psi\alpha^*$, where $\alpha^*$ denotes recovered transform coefficient vector and $x^*$ denotes the recovered length-N input signal.

Related Work:

In the first prior art approach, a video codec was proposed that encoded a subset of DCT transform coefficients of the block residue and employed a sparse signal recovery algorithm to recover the block residue from the coded coefficients. The sparse signal recovery is obtained through a total-variation (TV) minimization. TV is a function of the difference between consecutive pixels. An example of TV is as follows:

$$TV(x) = \Sigma_i |x_i - x_{i-1}|. \quad (4)$$

Then the problem becomes as follows:

$$\min TV(\alpha) \; s.t. \; y = \Phi x = \Phi\Psi\alpha, \quad (5)$$

where x is the residue data, i.e., the result of subtracting the prediction data from the original data. Basically, the approach tries to minimize the gradient of the reconstructed residue under the constraint of the observed data y. Since a quantization process is involved, perfect reconstruction is not possible in principle (i.e., the equality constraint is too restrictive), so the algorithm allows for some margin of error (denoted by $\epsilon$ in Equation (6)), by solving the following problem:

$$\min\{\mu^* TV(x) + \|y - \Phi x\|^2\}. \quad (6)$$

There are a few critical disadvantages in this approach. For example, the reconstruction algorithm in the first prior art approach employs a TV-minimization based algorithm to reconstruct the block residue. This approach works well assuming the block residue is sparse. However, the block residue is often not sparse in the gradient domain after block prediction, and this assumption is not compatible with the directional intra prediction which has already exploited the spatial redundancy.

To overcome this drawback, we have previously performed research and developed a scheme (hereinafter referred to as the second prior art approach) which proposes to recover the image block directly by applying TV-minimization on the pixel domain. In addition, we propose adjusting the $\mu$ adaptively with the quantization parameter so as to compensate quantization noise more efficiently. Although the second prior art approach works well with blocks having a smooth structure and few edges, it is not efficient with textured blocks. This is because textured blocks often are not sparse in the gradient domain.

Finding a domain in which textured blocks have sparse representation is a difficult problem because textured blocks have higher entropy and cannot be de-correlated or compressed efficiently with a fixed transform.

In a third prior art approach, it has been proposed to learn the sparsifying transform, called dictionary, from a training set of images with similar structures. For example, in the third prior art approach, a scheme is proposed in which the idea is to learn the best transform that can sparsify all patches in the training set:

$$\min\{\|X - \Phi S\|\} \; s.t. \; |S_i|_0 < L \quad (7)$$

where X is the matrix whose columns are training images or training image patches, $\Phi$ is the sparsifying transform or the dictionary to be learned, and S is the matrix of coefficient vectors that are constrained with the number of nonzero entries smaller than some fixed threshold. A method to optimize Equation (7) is called K-SVD. However, there are a few disadvantages in this learning approach. One of the disadvantages is that textured image patches often include different levels of sparsity. Hence, with a fixed sparsity threshold, some of the patches might be over-fitted or under-fitted with this model. This problem becomes more serious when patches are corrupted with quantization noise. This method was developed to tackle de-noising of images, mainly for Gaussian noise.

A Typical Video CODEC:

Turning to FIG. 3, a method for encoding image data for a picture is indicated generally by the reference numeral 300. The method 300 includes a start block 310 that passes control to a loop limit block 320. The loop limit block 320 begins a loop using a variable i having a range from 1, . . . , number (#) of blocks in the picture, and passes control to a function block 330. The function block 330 performs intra/inter prediction to obtain a prediction for a current block, and passes control to a function block 340. The function block 340 applies a DCT transform to a residue (representing a difference between an original version of the current block and the prediction for the current block) to obtain transform coefficients there for, and passes control to a function block 350. The function block 350 quantizes the transform coefficients to obtain quantized transform coefficients, and then passes control to a function block 360. The function block 360 entropy codes the quantized transform coefficients, and passes control to a function block 370. The function block 370 inverse quantizes the quantized transform coefficients, and passes control to a function block 380. The function block 380 inverse transforms (using, e.g., an inverse discrete cosine transform (IDCT)) the inverse quantized transform coefficients to obtain a reconstructed residue for the current block, and passes control to a function block 390. The function block 390 reconstructs the current block by adding the reconstructed residue for the current block to the prediction for the current block, and passes control to a loop limit block 395. The loop limit block 395 ends the loop, and passes control to an end block 399.

Turning to FIG. 4, a method for decoding image data for a picture is indicated generally by the reference numeral 400. The method 400 includes a start block 410 that passes control to a loop limit block 420. The loop limit block 420 begins a loop using a variable i having a range from 1, . . . , number (#) of blocks in the picture, and passes control to a function block 430. The function block 430 performs entropy decoding to obtain the quantized transform coefficients, the intra/inter prediction modes and other information, and passes control to a function block 440. The function block 440 inverse quantizes the quantized transform coefficients of the current block, and passes control to a function block 450. The function block 450 inverse transforms (using, e.g., an inverse discrete cosine transform (DCT)) the inverse quantized transform coefficients to obtain a reconstructed residue, and passes control to a function 460. The function block 460 reconstructs the current block by adding the reconstructed residue for the current block to the prediction for the current block, and passes control to a loop limit block 470. The loop limit block 470 ends the loop, and passes control to an end block 499.

Due to quantization, there is quantization noise in a reconstructed block. In accordance with the principles of the present invention, we disclose and describe methods to mitigate the effect of quantization noise.

Our Previous Work:

The aforementioned second prior art approach proposed a video CODEC that incorporated a new compressive sensing coding mode. With this compressive sensing coding mode, instead of encoding all transform coefficients of the block residue, it was proposed to encode only a subset of transform coefficients and disregard the remaining transform coefficients. The transform coefficients were scanned in a zigzag order and the first coefficients were selected as the subset. This subset of transform coefficients was put into a vector that is referred to as a measurement vector of the block residue. The measurement acquisition is mathematically represented as follows:

$$y_{res}=A(x_{res}), \quad (8)$$

where $x_{res}$ denotes the block residue; $y_{res}$ denotes a vector that includes a subset of the transform coefficients of the block residue; A denotes an operator that transforms the block residue (via the 2-D DCT transform or the integer MPEG-4 AVC Standard transform) and then selects a subset of first entries with respect to the zigzag scanning order.

Given the predicted block and the measurement vector of the block residue $y_{res}$, the block is reconstructed using the following steps.

Step 1: Generate a measurement vector of the predicted block that contains a subset of significant transform coefficients of block residue, denoted as $y_{pred}$:

$$y_{pred}=A(x_{pred}) \quad (9)$$

Step 2: Generate a measurement vector of the block by adding the measurement vector of block residue to the measurement vector of predicted block:

$$y=y_{res}+y_{pred} \quad (10)$$

Step 3: Solve the following optimization for a final reconstructed block:

$$x_{rec}=\text{Arg Min}_X\{\Psi(x)+\mu^*|y-A(x)|^2\} \quad (11)$$

where $x_{rec}$ is a final reconstructed block, $\Psi$ is Total Variation of x, and $\mu$ is a weighting factor. The optimization variable is x. Quantization noise is introduced when the measurement vector of block residue $y_{res}$ is quantized. To compensate the quantization noise, the factor $\mu$ is adjusted adaptively with respect to the quantization step size.

Turning to FIG. 5, a method for block reconstruction is indicated generally by the reference numeral 500. The method 500 includes a start block 510 that passes control to a function block 520. The function block 520 generates a measurement vector of a predicted block, the measurement vector being a subset of the transform coefficients of the predicted block, and passes control to a function block 530. The function block 530 adds the measurement vector of the predicted block to the (de-quantized) measurement vector of the block residue to yield a measurement vector of a reconstructed block, the measurement vector of the block residue being a subset of the transform coefficients of the block residue and passes control to a function block 540. The function block 540 minimizes the objective function with the measurement vector of the reconstructed block, and passes control to an end block 599.

The new block reconstruction method is incorporated into a video codec as a new compressive sensing coding mode. Based on Rate-Distortion optimization, the encoder decides to encode a block residue using the existing coding modes or the compressive sensing coding mode. For each block with at least a coefficient different from zero, a flag is sent to the decoder to indicate whether or not the encoder employs the compressive sensing mode.

Turning to FIG. 6, a method for encoding image data for a picture is indicated generally by the reference numeral 600. The method 600 advantageously incorporates a novel compressive sensing mode and a novel block reconstruction in accordance with the present principles. The method 600 includes a start block 605 that passes control to a loop limit block 610. The loop limit block 610 begins a loop using a variable i having a range equal to 1, . . . , number (#) of blocks, and passes control to a function block 615. The function block 615 performs intra/inter prediction, and passes control to a function block 620. The function block 620 applies a DCT transform to a residue to obtain the transform coefficients, and passes control to a function block 625. The function block 625 performs coefficient truncation to obtain the measurement vector (by keeping only a subset of the transform coefficients), and passes control to a function block 630. The function block 630 quantizes the (truncated) transform coefficients, and passes control to a function block 635. The function block 635 entropy codes the quantized transform coefficients, and passes control to a function block 640. The function block 640 inverse quantizes the quantized transform coefficients, and passes control to a function block 645. The function block 645 performs block measurement generation, for example using the method 500 in FIG. 5, and passes control to a function block 650. The function block 650 obtains a TV-minimum reconstructed block by solving the optimization problem described in Equation (11), and passes control to a function block 655. The function block 655 performs a rate-distortion computation to obtain a rate-distortion value J1, and passes control to a decision block 690. The decision block 690 determines whether or not J1<J2. If so, then control is passed to a function block 692. Otherwise, control is passed to a function block 694. The function block 692 selects the compressive sensing (CS) coding method, sets CS_flag=1, and passes control to a loop limit block 696. The function block 694 selects the normal coding modes, sets CS_flag=0, and passes control to the loop limit block 696. The loop limit block 696 ends the loop, and passes control to an end block 699. The function block 660 quantizes the transform coefficients, and passes control to a function block 665. The function block 665 entropy codes the quantized transform coefficients, and passes control to a function block 670. The function block 670 inverse quantizes the quantized transform coefficients, and passes control to a function block 675. The function block 675 applies an inverse discrete cosine transform (IDCT) to the quantized transform coefficients to obtain a reconstructed residue, and passes control to a function block 680. The function block 680 adds the reconstructed residue (obtained by function block 680) to the prediction (obtained by function block 615) to obtain a prediction compensated reconstructed block, and passes control to a function block 685. The function block 685 performs a rate-distortion computation to obtain a rate-distortion value J2, and passes control to the decision block 690.

Turning to FIG. 7, a method for decoding image data for a picture is indicated generally by the reference numeral 700. The method 700 advantageously incorporates a novel compressive sensing mode and a novel block reconstruction in accordance with the present principles. The method 700 includes a start block 705 that passes control to a loop limit block 710. The loop limit block 710 begins a loop using a variable i having a range from 1, . . . , number (#) of blocks, and passes control to a function block 715. The function block 715 entropy decodes a bitstream and obtains the quantized transform coefficients of the residue, the Intra/Inter prediction modes, etc., and passes control to a function block 720. The function block 720 reads CS_Flag, and passes control to a decision block 725. The decision block 725 determines whether or not CS_Flag=1. If so, then control is passed to a function block 730. Otherwise, control is passed to a function block 750. The function block 730 inverse quantizes the quantized transform coefficients to obtain the transform coefficients of the residue, and passes control to a function block 735. The function block 735 performs block measurement generation, for example using the method 500 in FIG. 5, and passes control to a function block 740. The function block 740 obtains a TV-minimization reconstructed block by solving the optimization problem in Equation (11), and passes control to a loop limit 745. The loop limit block 745 ends the loop, and passes control to an end block 799. The function block 750 inverse quantizes the quantized transform coefficients of the residue to obtain the transform coefficients, and passes control to a function block 755. The function block 755 applies an inverse transform (e.g., an inverse discrete cosine transform (IDCT)) to the transform coefficients of the residue to reconstruct the residue, and passes control to a function block 760. The function block 760 obtains a prediction compensation reconstructed block by adding the reconstructed residue for the current block to the prediction for the current block, and passes control to the loop limit block 745.

As part of the encoder, our previously proposed method of block reconstruction attempted to reconstruct a block in the image/pixel domain rather than to reconstruct block residue as in the first prior art approach. We employed a 2-D DCT transform (or integer MPEG-4 AVC Standard transform) to obtain transform coefficients of the block residue. To reconstruct the signal, we employed a TV-minimization algorithm to reconstruct the block. Moreover, to compensate for the quantization noise, we adjusted the factor μ in Equation (11) adaptively with respect to the quantization step size.

SUMMARY

These and other drawbacks and disadvantages of the prior art are addressed by the present principles, which are directed to methods and apparatus for video encoders and decoders using compressive sensing.

According to an aspect of the present principles, there is provided an apparatus. The apparatus includes a video encoder for encoding an image block in a picture by determining from a training data set an adaptive transform for transforming a signal capable of representing the image block into zero coefficients and non-zero coefficients, reconstructing the image block in a pixel domain to obtain a reconstructed version of the image block by minimizing a number of the non-zero coefficients in a transform domain corresponding to the transform responsive to information of the signal and a prediction of the image block, and incorporating the reconstructed version of the image block into a coding mode that is absent from any video coding standards and video coding recommendations.

According to another aspect of the present principles, there is provided a method in a video encoder. The method includes encoding an image block in a picture by determining from a training data set an adaptive transform for transforming a signal capable of representing the image block into zero coefficients and non-zero coefficients, reconstructing the image block in a pixel domain to obtain a reconstructed version of the image block by minimizing a number of the non-zero coefficients in a transform domain corresponding to the transform responsive to information of the signal and a prediction of the image block, and incorporating the reconstructed version of the image block into a coding mode that is absent from any video coding standards and video coding recommendations.

According to yet another aspect of the present principles, there is provided an apparatus. The apparatus includes a video decoder for decoding an image block in a picture from a bitstream by determining from a training data set or the bitstream an adaptive transform for transforming a signal capable of representing the image block into zero coefficients and non-zero coefficients, reconstructing the image block in a pixel domain to obtain a reconstructed version of the image block by minimizing a number of the non-zero coefficients in a transform domain corresponding to the transform responsive to information of the signal and a prediction of the image block, and incorporating the reconstructed version of the image block into a decoding mode that is absent from any video coding standards and video coding recommendations.

According to still another aspect of the present principles, there is provided a method in a video decoder. The method includes decoding an image block in a picture from a bitstream by determining from a training data set or the bitstream an adaptive transform for transforming a signal capable of representing the image block into zero coefficients and non-zero coefficients, reconstructing the image block in a pixel domain to obtain a reconstructed version of the image block by minimizing a number of the non-zero coefficients in a transform domain corresponding to the transform responsive to information of the signal and a prediction of the image block, and incorporating the reconstructed version of the image block into a decoding mode that is absent from any video coding standards and video coding recommendations.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
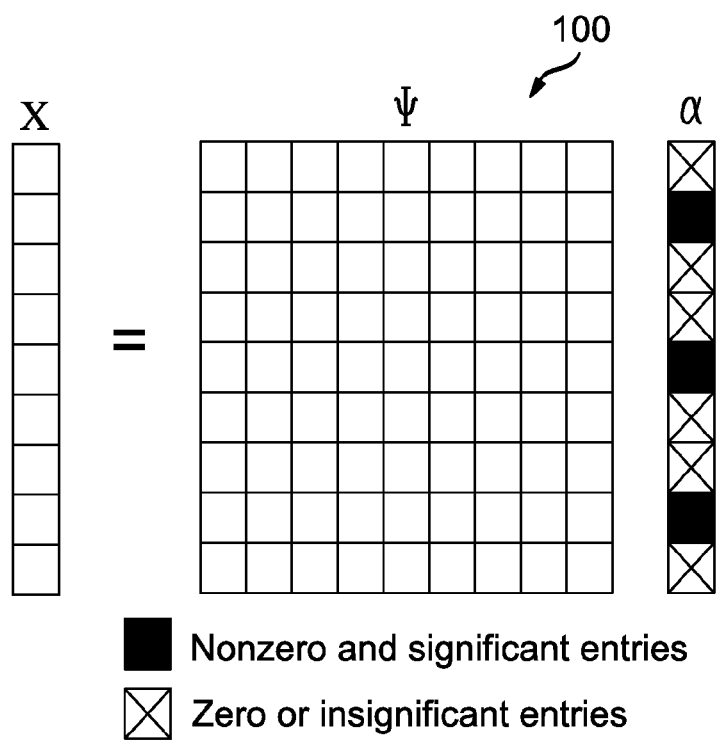
FIG. 1 is a diagram showing a representation of a sparse signal to which the present principles may be applied.
Figure 2:
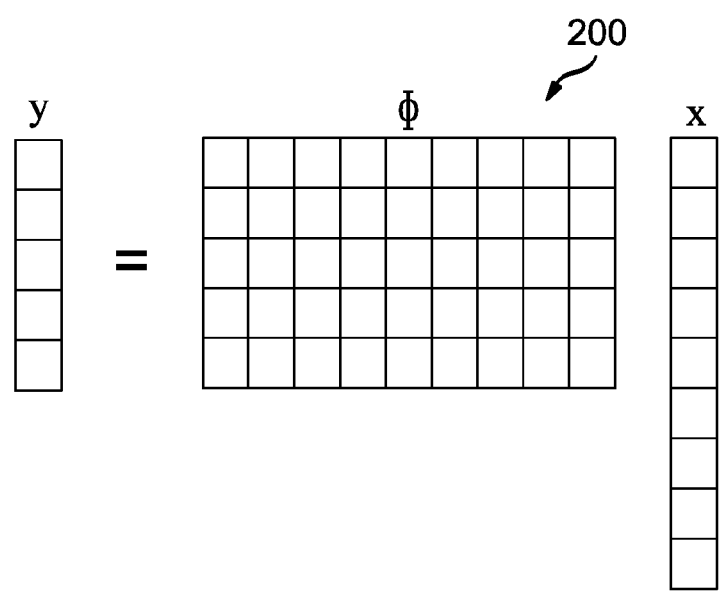
FIG. 2 is a diagram showing a method for measurement acquisition in compressive sensing in accordance with the prior art.
Figure 3:
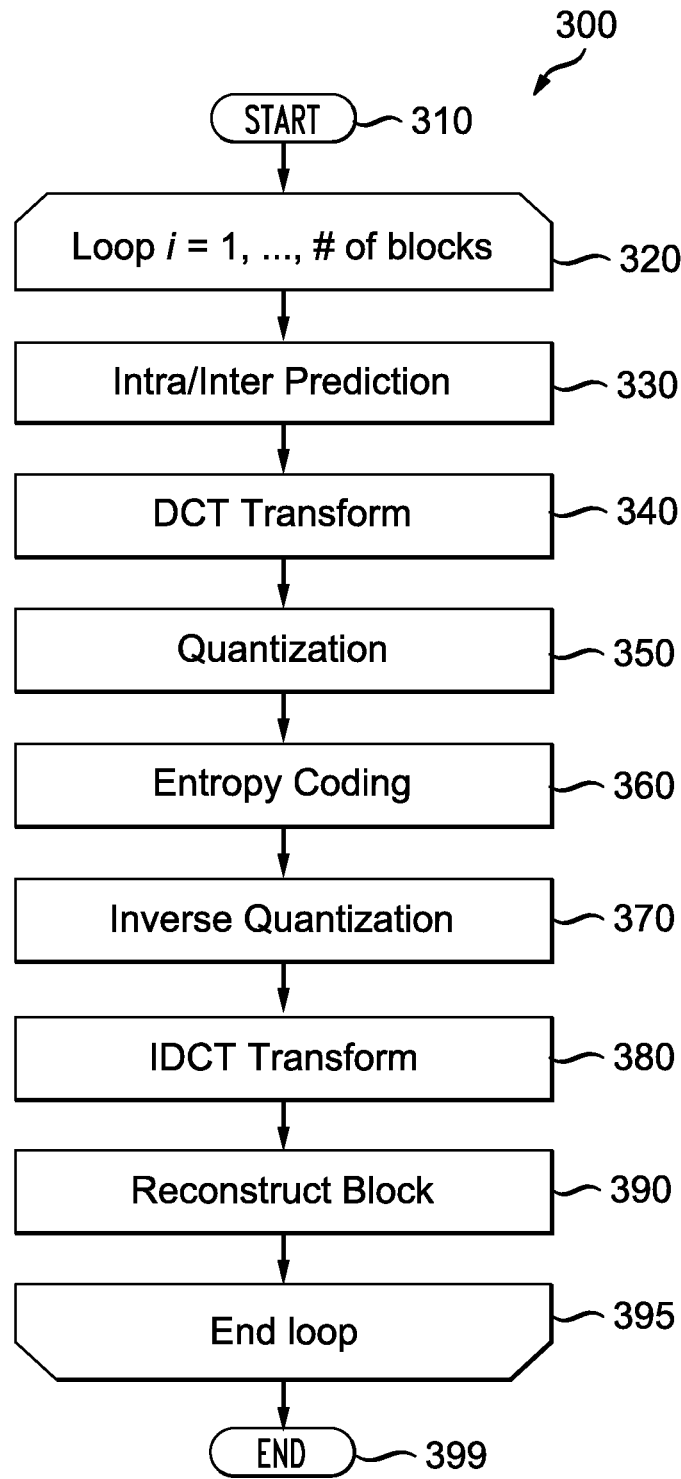
FIG. 3 is a flow diagram showing a method for encoding image data for a picture in accordance with the prior art.
Figure 4:
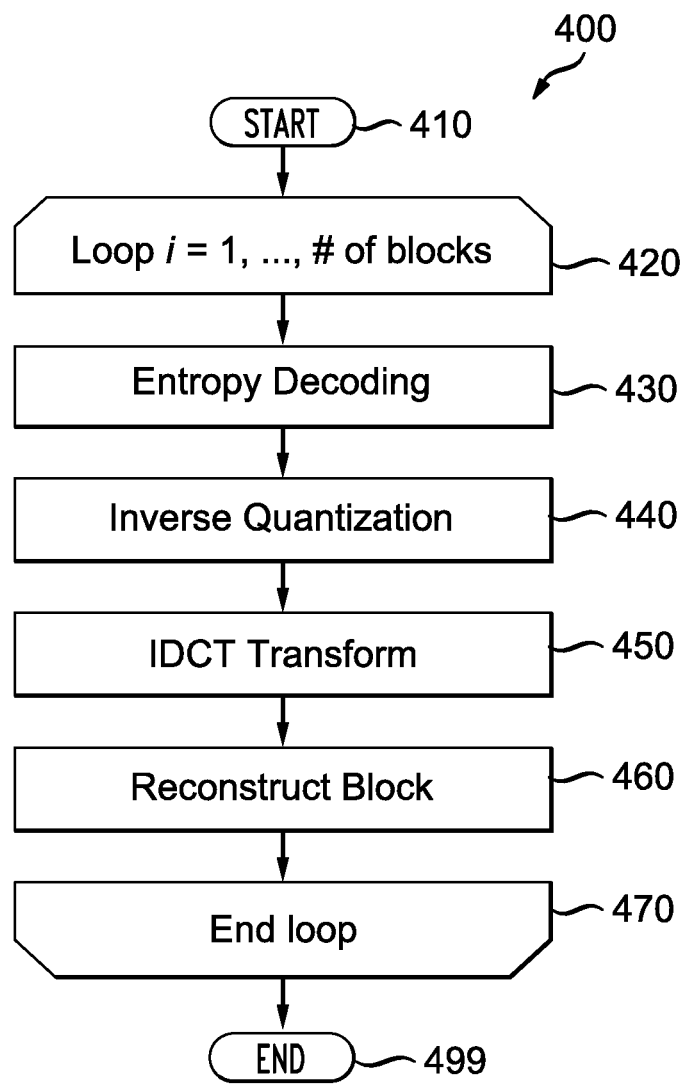
FIG. 4 is a flow diagram showing a method for decoding image data for a picture in accordance with the prior art.

The present principles are directed to methods and apparatus for video encoders and decoders using compressive sensing.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Figure 8:
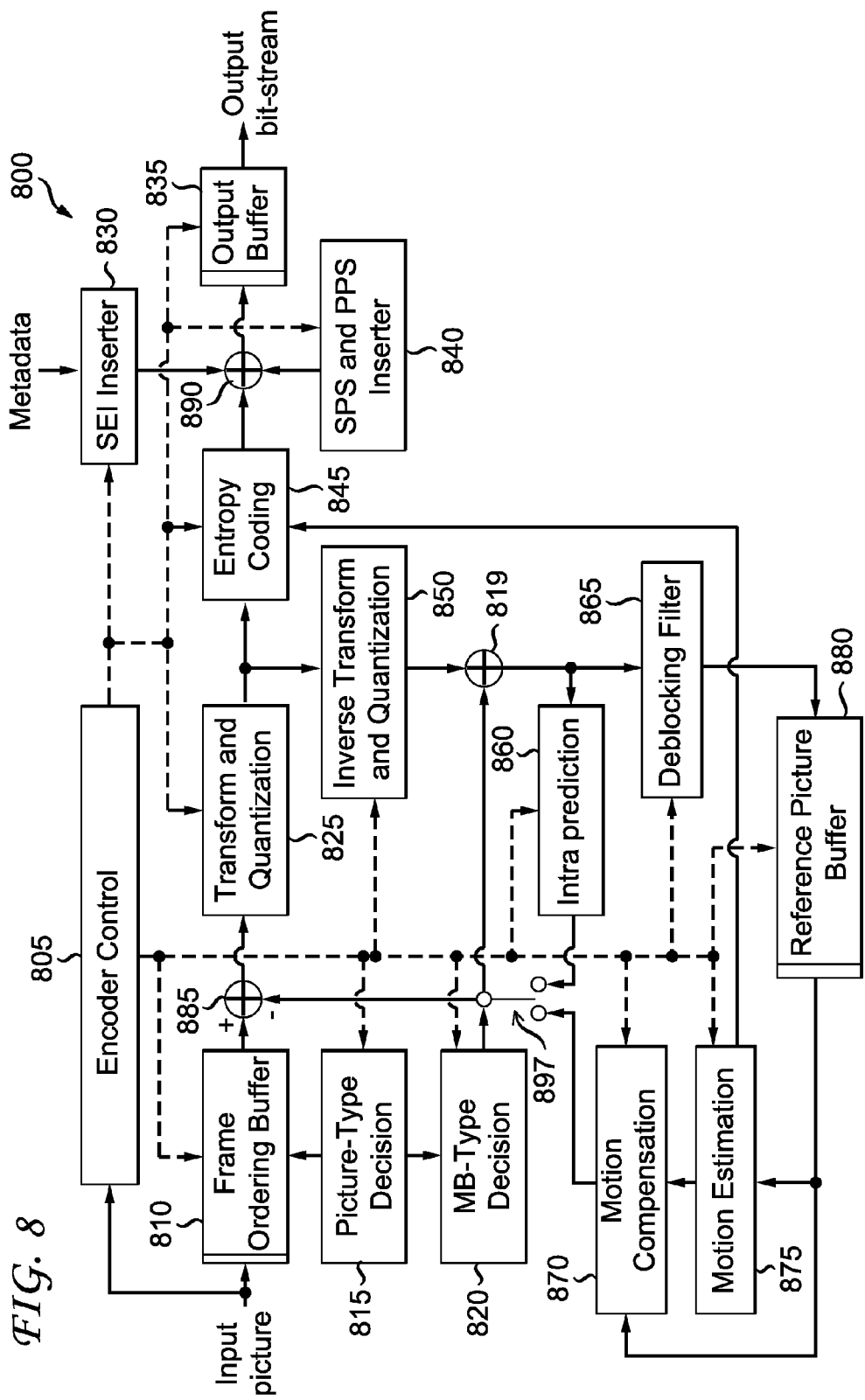
FIG. 8 is a block diagram showing an exemplary video encoder to which the present principles may be applied, in accordance with an embodiment of the present principles.

Turning to FIG. 8, an exemplary video encoder to which the present principles may be applied is indicated generally by the reference numeral 800. The video encoder 800 includes a frame ordering buffer 810 having an output in signal communication with a non-inverting input of a combiner 885. An output of the combiner 885 is connected in signal communication with a first input of a transformer and quantizer 825. An output of the transformer and quantizer 825 is connected in signal communication with a first input of an entropy coder 845 and a first input of an inverse transformer and inverse quantizer 850. An output of the entropy coder 845 is connected in signal communication with a first non-inverting input of a combiner 890. An output of the combiner 890 is connected in signal communication with a first input of an output buffer 835.

A first output of an encoder controller 805 is connected in signal communication with a second input of the frame ordering buffer 810, a second input of the inverse transformer and inverse quantizer 850, an input of a picture-type decision module 815, a first input of a macroblock-type (MB-type) decision module 820, a second input of an intra prediction module 860, a second input of a deblocking filter 865, a first input of a motion compensator 870, a first input of a motion estimator 875, and a second input of a reference picture buffer 880.

A second output of the encoder controller 805 is connected in signal communication with a first input of a Supplemental Enhancement Information (SEI) inserter 830, a second input of the transformer and quantizer 825, a second input of the entropy coder 845, a second input of the output buffer 835, and an input of the Sequence Parameter Set (SPS) and Picture Parameter Set (PPS) inserter 840.

An output of the SEI inserter 830 is connected in signal communication with a second non-inverting input of the combiner 890.

A first output of the picture-type decision module 815 is connected in signal communication with a third input of the frame ordering buffer 810. A second output of the picture-type decision module 815 is connected in signal communication with a second input of a macroblock-type decision module 820.

An output of the Sequence Parameter Set (SPS) and Picture Parameter Set (PPS) inserter 840 is connected in signal communication with a third non-inverting input of the combiner 890.

An output of the inverse quantizer and inverse transformer 850 is connected in signal communication with a first non-inverting input of a combiner 819. An output of the combiner 819 is connected in signal communication with a first input of the intra prediction module 860 and a first input of the deblocking filter 865. An output of the deblocking filter 865 is connected in signal communication with a first input of a reference picture buffer 880. An output of the reference picture buffer 880 is connected in signal communication with a second input of the motion estimator 875 and a third input of the motion compensator 870. A first output of the motion estimator 875 is connected in signal communication with a second input of the motion compensator 870. A second output of the motion estimator 875 is connected in signal communication with a third input of the entropy coder 845.

An output of the motion compensator 870 is connected in signal communication with a first input of a switch 897. An output of the intra prediction module 860 is connected in signal communication with a second input of the switch 897. An output of the macroblock-type decision module 820 is connected in signal communication with a third input of the switch 897. The third input of the switch 897 determines whether or not the "data" input of the switch (as compared to the control input, i.e., the third input) is to be provided by the motion compensator 870 or the intra prediction module 860. The output of the switch 897 is connected in signal communication with a second non-inverting input of the combiner 819 and an inverting input of the combiner 885.

A first input of the frame ordering buffer 810 and an input of the encoder controller 505 are available as inputs of the encoder 800, for receiving an input picture. Moreover, a second input of the Supplemental Enhancement Information (SEI) inserter 830 is available as an input of the encoder 800, for receiving metadata. An output of the output buffer 835 is available as an output of the encoder 800, for outputting a bitstream.

Figure 9:
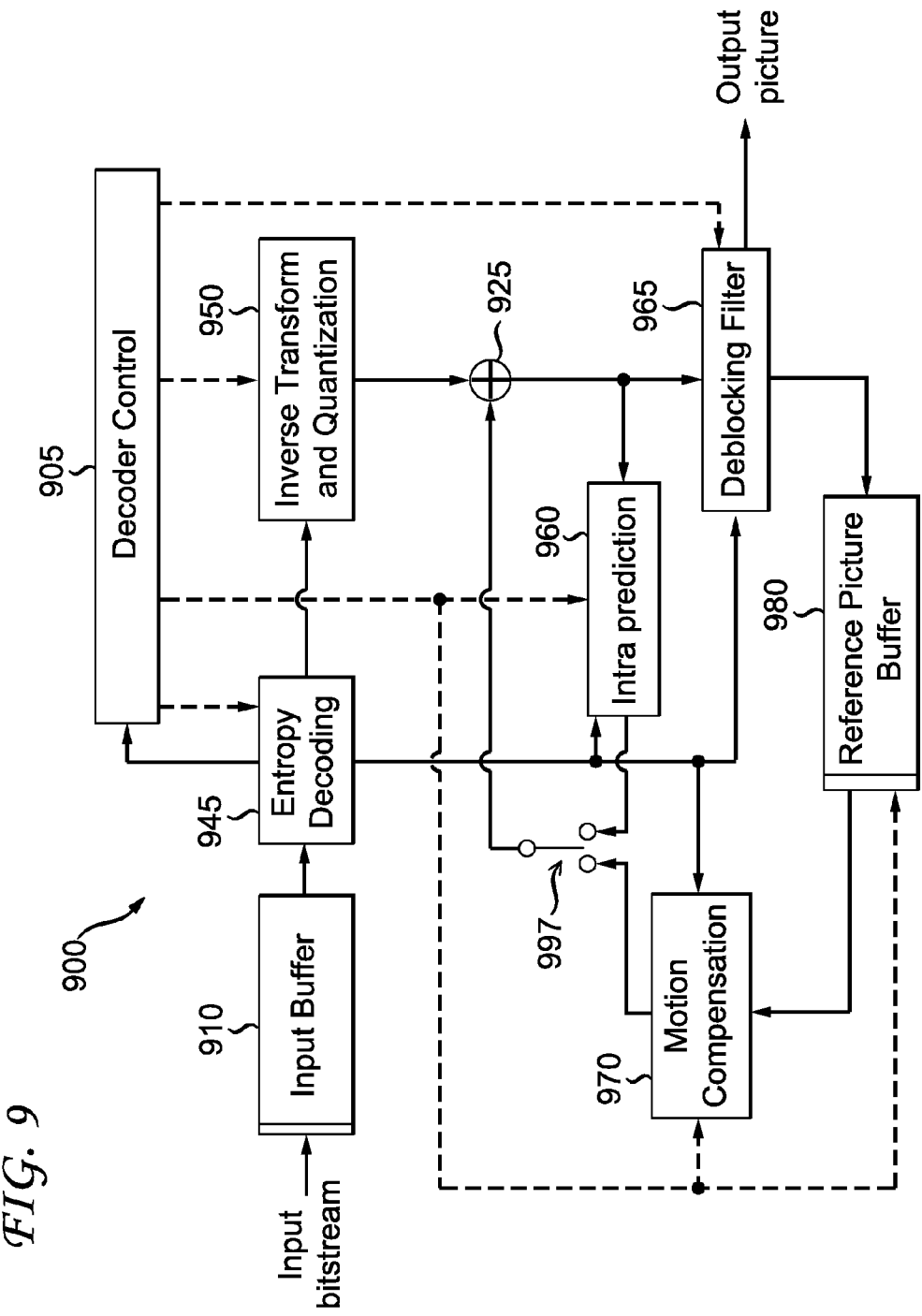
FIG. 9 is a block diagram showing an exemplary video decoder to which the present principles may be applied, in accordance with an embodiment of the present principles.

Turning to FIG. 9, an exemplary video decoder to which the present principles may be applied is indicated generally by the reference numeral 900. The video decoder 900 includes an input buffer 910 having an output connected in signal communication with a first input of an entropy decoder 945. A first output of the entropy decoder 945 is connected in signal communication with a first input of an inverse transformer and inverse quantizer 950. An output of the inverse transformer and inverse quantizer 950 is connected in signal communication with a second non-inverting input of a combiner 925. An output of the combiner 925 is connected in signal communication with a second input of a deblocking filter 965 and a first input of an intra prediction module 960. A second output of the deblocking filter 965 is connected in signal communication with a first input of a reference picture buffer 980. An output of the reference picture buffer 980 is connected in signal communication with a second input of a motion compensator 970.

A second output of the entropy decoder 945 is connected in signal communication with a third input of the motion compensator 970, a first input of the deblocking filter 965, and a third input of the intra predictor 960. A third output of the entropy decoder 945 is connected in signal communication with an input of a decoder controller 905. A first output of the decoder controller 905 is connected in signal communication with a second input of the entropy decoder 645. A second output of the decoder controller 605 is connected in signal communication with a second input of the inverse transformer and inverse quantizer 950. A third output of the decoder controller 905 is connected in signal communication with a third input of the deblocking filter 965. A fourth output of the decoder controller 605 is connected in signal communication with a second input of the intra prediction module 660, a first input of the motion compensator 970, and a second input of the reference picture buffer 980.

An output of the motion compensator 970 is connected in signal communication with a first input of a switch 997. An output of the intra prediction module 960 is connected in signal communication with a second input of the switch 997. An output of the switch 997 is connected in signal communication with a first non-inverting input of the combiner 925.

An input of the input buffer 910 is available as an input of the decoder 900, for receiving an input bitstream. A first output of the deblocking filter 965 is available as an output of the decoder 900, for outputting an output picture.

As noted above, the present principles are directed to methods and apparatus for video encoding and decoding with learned transform and compressive sensing.

We further note that in current state-of-the-art video codecs (e.g., the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) 11.264 Recommendation (hereinafter the "MPEG-4 AVC Standard"), the ISO/IEC MPEG-2 Standard, and so forth), quantization noise, which results from quantization and de-quantization of transform coefficients of block residue, generates more performance loss when the quantization parameter gets coarser. Accordingly, we disclose and describe methods and apparatus which mitigate the quantization noise and improve the coding efficiency. The proposed reconstruction in accordance with the present principles can be partially regarded as a de-noising method. In addition, to further improve coding efficiency, only a subset of transform coefficients are encoded, with the remaining transform coefficients being discarded. The present principles advantageously are employed to both compensate the quantization noise and recover the truncated transform coefficients. The present principles are used to reconstruct an image block from its quantized transform coefficients. The present principles attempt to compensate quantization noise by regularizing the reconstructed blocks. The reconstructed blocks are regularized in the learned sparsifying transform domain. It can also be used in combination with the regularization in the gradient domain. The proposed image reconstruction method is incorporated into a video encoder and/or video decoder as a new mode. The encoder adaptively selects between the regular modes and the new mode to reconstruct the image block.

A Novel Approach:

Our previous method, namely the aforementioned second prior art approach, works well with blocks having a smooth structure and few edges (i.e., the block is sparse in the gradient domain). However, the second prior art approach is not efficient with textured blocks because textured blocks often are not sparse in the gradient domain. In accordance with the present principles, we propose methods and apparatus to improve the coding efficiency for the textured blocks. Rather than using a fixed sparsifying transform (i.e., Total Variation), we learn the sparsifying transform using dictionary learning methods and the transform is adaptive to the pictures.

Taking into account the quantization noise and the fact that textured blocks often have different levels of sparsity, we propose a new objective function based on Equation (7) to learn a sparsifying transform $\Psi$ as follows:

$$\min\{\eta * \|S\|_1 + \|X - \Phi S\|^2\} \quad (12)$$

where $\eta$ is tuned adaptively with the quantization parameter. Different from the optimization problem defined in Equation (7), the new objective function does not put a fixed constraint of sparsity to column vectors of coefficient matrix S. The new objective function provides more flexibility for the learning process, yielding a learned dictionary that adapts better to a variety of training textured patches. The training set X can be from the original pictures, the previously reconstructed pictures, or from other pictures.

The block reconstruction proceeds with the following three steps:

Step 1: Generate a measurement vector of the predicted block that contains a subset of significant transform coefficients of block residue, denoted as $y_{pred}$:

$$y_{pred} = A(x_{pred}) \quad (13)$$

Step 2: Generate a measurement vector of the block by adding the measurement vector of block residue to the measurement vector of predicted block:

$$y = y_{res} + y_{pred} \quad (14)$$

Step 3: Solve the following optimization to reconstruct the block:

$$\alpha_{res} = \text{ArgMin}_\alpha \{\|y - A(\Psi^*\alpha)\|^2 + \mu_1 * |\alpha|_1\}; x_{rec} = \Psi^* \alpha_{rec} \quad (15)$$

where $x_{rec}$ is a reconstructed block, $\Psi$ is the learned transform, and $\mu_1$ is a weighting factor. The optimization variable is $\alpha$. Quantization noise is introduced when the measurement vector of block residue $y_{res}$ is quantized (and then de-quantized at the decoder side). To compensate for this quantization noise, the factor is adjusted adaptively with respect to the quantization step size.

To further improve the coding efficiency, a variation is to consider both the learned dictionary and the Total Variation transform as the sparsifying transforms. Under this consideration, step 3 becomes as follows:

Step 3: Solve the following optimization for a final reconstructed block $$\alpha_{rec} = \text{ArgMin}_\alpha \{\|y - A(\Psi^*\alpha)\|^2 + \mu_1 * TV(\Psi^*\alpha) + \mu_2 * |\alpha|_1\}; \\ x_{rec} = \Psi^*\alpha_{rec} \quad (16)$$

Similar to our previous method, an extra compressive sensing mode is used to incorporate the new block reconstruction algorithm into the video encoder and/or decoder. Our proposed method of block reconstruction also attempts to reconstruct a block in the image/pixel domain as in our prior approach.

Different from the second prior art approach, we regularize the reconstructed blocks to be sparse in the learned transform domain. In a variation, we regularize in both the gradient transform domain and the learned transform domain. While sparsity-constraint in the gradient transform domain helps to recover smooth blocks, sparsity-constraint in the learned transform domain can deal with textured blocks better. Moreover, to compensate for the quantization noise, we adjust the weighting factor adaptively with respect to the quantization step size.

Figure 5:
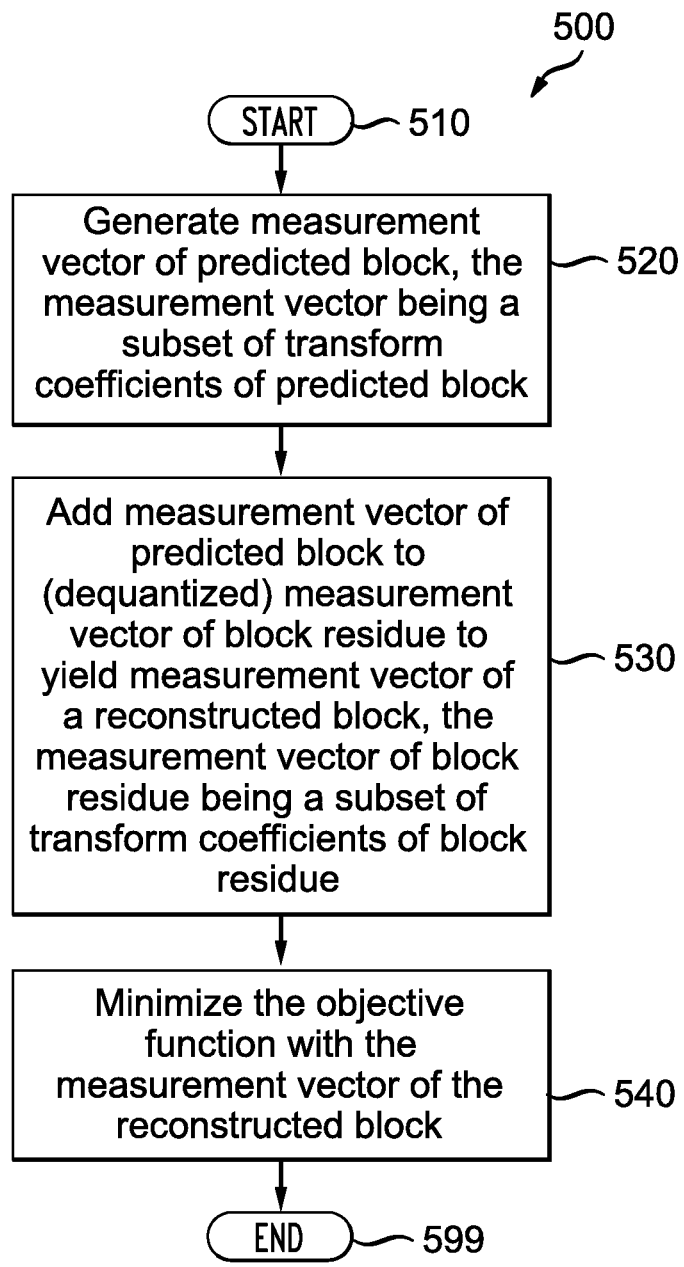
FIG. 5 is a flow diagram showing a method for block reconstruction in accordance with the prior art.
Figure 6:
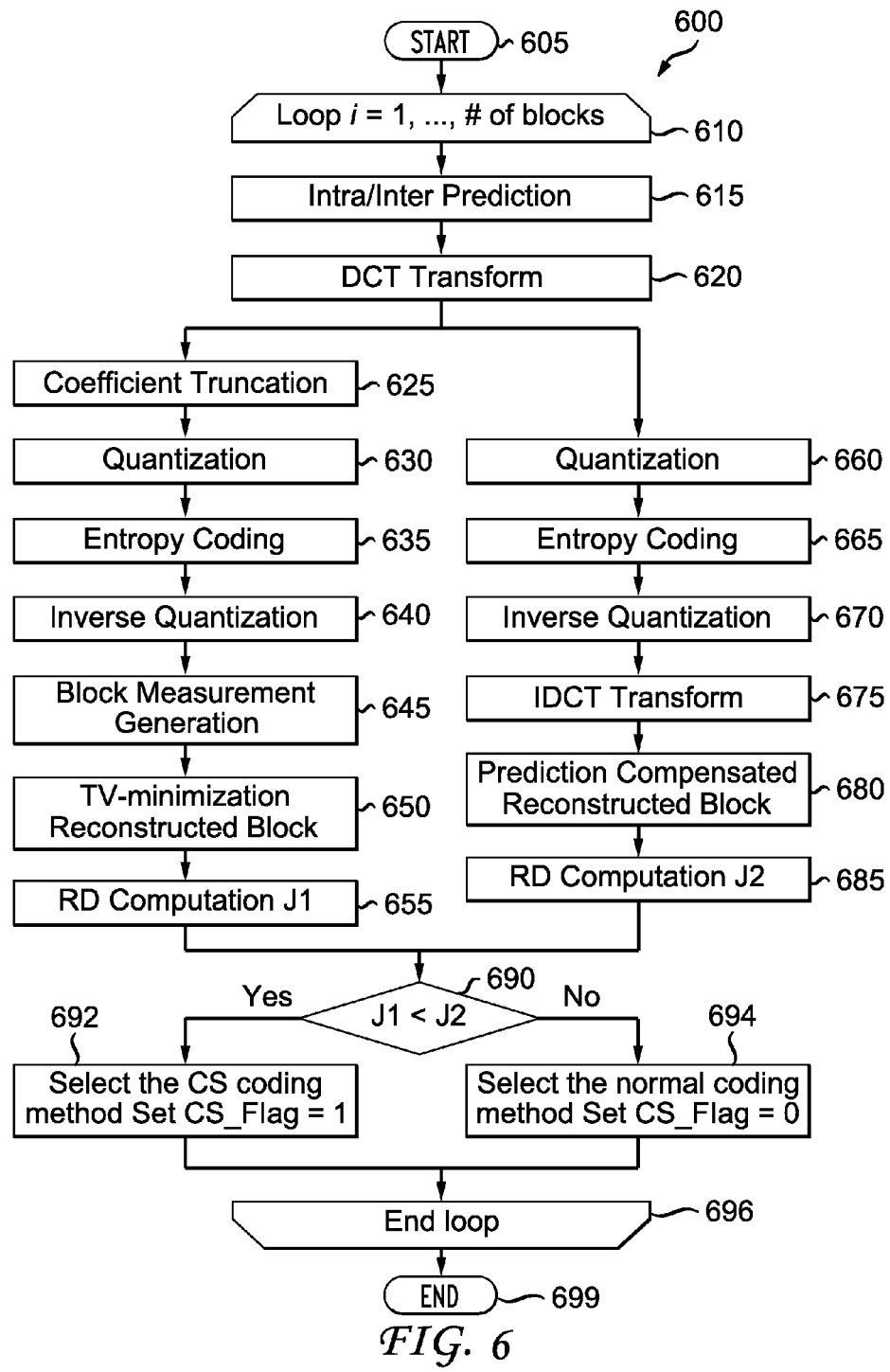
FIG. 6 is a flow diagram showing a method for encoding image data for a picture in accordance with the prior art.
Figure 7:
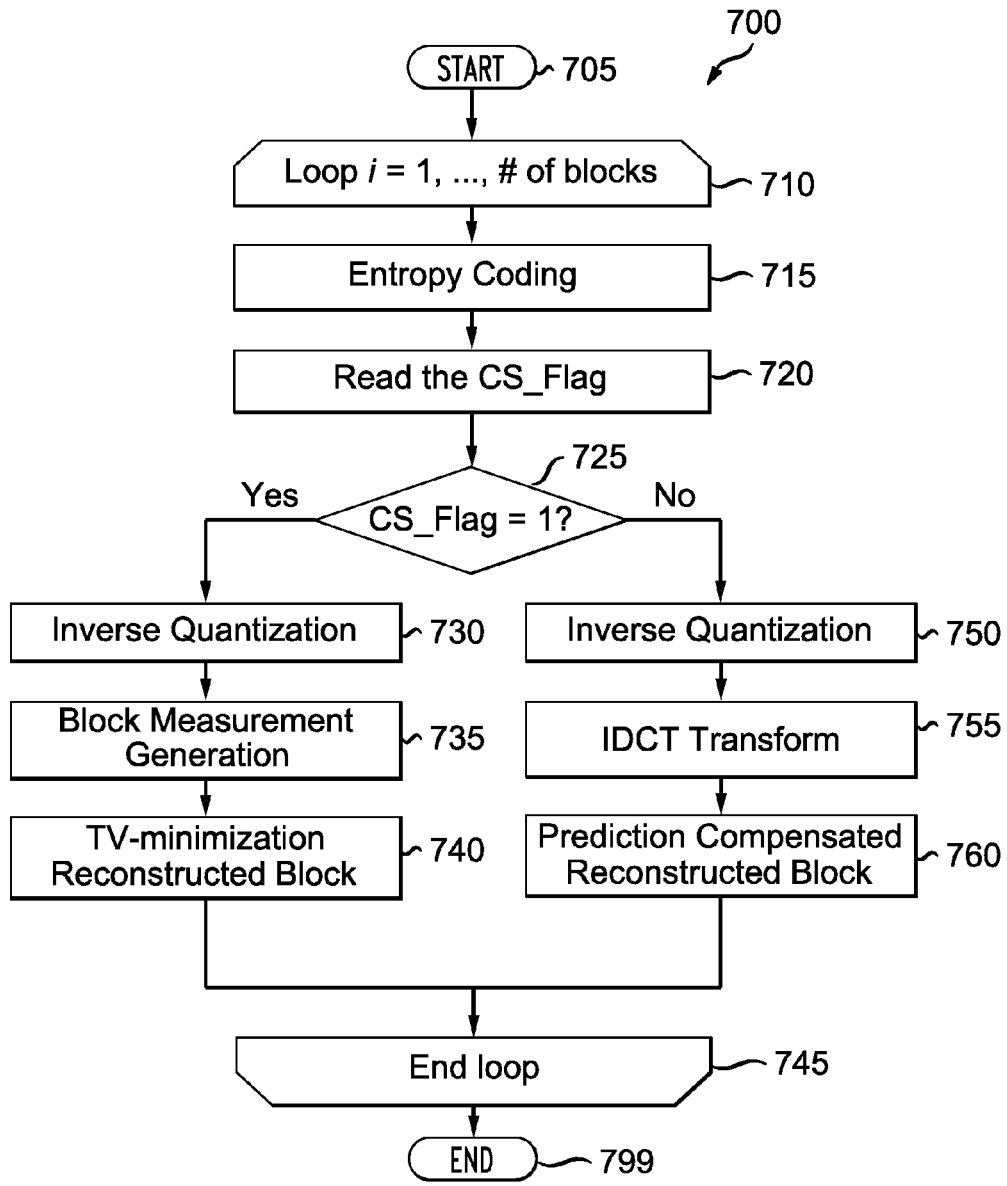
FIG. 7 is a flow diagram showing a method for decoding image data for a picture in accordance with the prior art.
Figure 10:
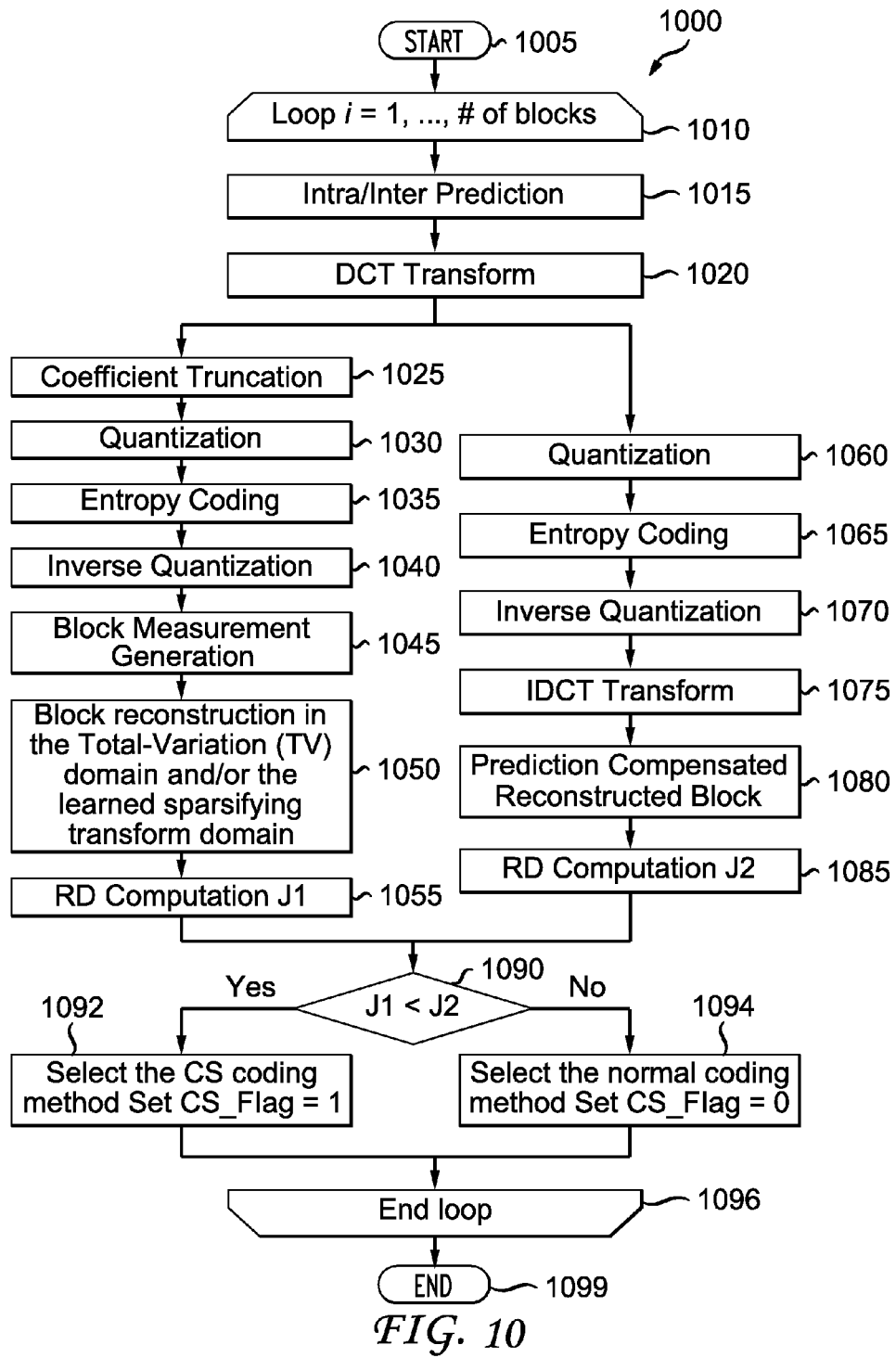
FIG. 10 is a flow diagram showing a method for encoding image data for a picture, in accordance with an embodiment of the present principles.

Turning to FIG. 10, an exemplary method for encoding image data for a picture is indicated generally by the reference numeral 1000. The method 1000 advantageously incorporates a novel compressive sensing mode and a novel block reconstruction in accordance with the present principles. The method 1000 includes a start block 1005 that passes control to a loop limit block 1010. The loop limit block 1010 begins a loop using a variable i having a range equal to 1, ..., number (#) of blocks, and passes control to a function block 1015. The function block 1015 performs intra/inter prediction, and passes control to a function block 1020. The function block 1020 applies a DCT transform to a residue to obtain the transform coefficients, and passes control to a function block 1025. The function block 1025 performs coefficient truncation to obtain the measurement vector (by keeping only a subset of the transform coefficients), and passes control to a function block 1030. The function block 1030 quantizes the (truncated) transform coefficients, and passes control to a function block 1035. The function block 1035 entropy codes the quantized transform coefficients, and passes control to a function block 1040. The function block 1040 inverse quantizes the quantized transform coefficients, and passes control to a function block 1045. The function block 1045 performs block measurement generation, for example using the method 500 in FIG. 5, and passes control to a function block 1050. The function block 1050 performs a block reconstruction in the Total-Variation (TV) domain and/or in the learned sparsifying transform domain by solving the optimization problem described in Equation (16), and passes control to a function block 1055. The function block 1055 performs a rate-distortion computation to obtain a rate-distortion value J1, and passes control to a decision block 1090. The decision block 1090 determines whether or not J1<J2. If so, then control is passed to a function block 1092. Otherwise, control is passed to a function block 1094. The function block 1092 selects the compressive sensing (CS) coding method, sets CS_flag=1, and passes control to a loop limit block 1096. The function block 1094 selects the normal coding modes, sets CS_flag=0, and passes control to a loop limit block 1096. The loop limit block 1096 ends the loop, and passes control to an end block 1099. The function block 1060 quantizes the transform coefficients, and passes control to a function block 1065. The function block 1065 entropy codes the quantized transform coefficients, and passes control to a function block 1070. The function block 1070 inverse quantizes the quantized transform coefficients, and passes control to a function block 1075. The function block 1075 applies an inverse discrete cosine transform (IDCT) to the quantized transform coefficients to obtain a reconstructed residue, and passes control to a function block 1080. The function block 1080 adds the reconstructed residue (obtained by function block 1080) to the prediction (obtained by function block 1015) to obtain a prediction compensated reconstructed block, and passes control to a function block 1085. The function block 1085 performs a rate-distortion computation to obtain a rate-distortion value J2, and passes control to the decision block 1090.

Figure 11:
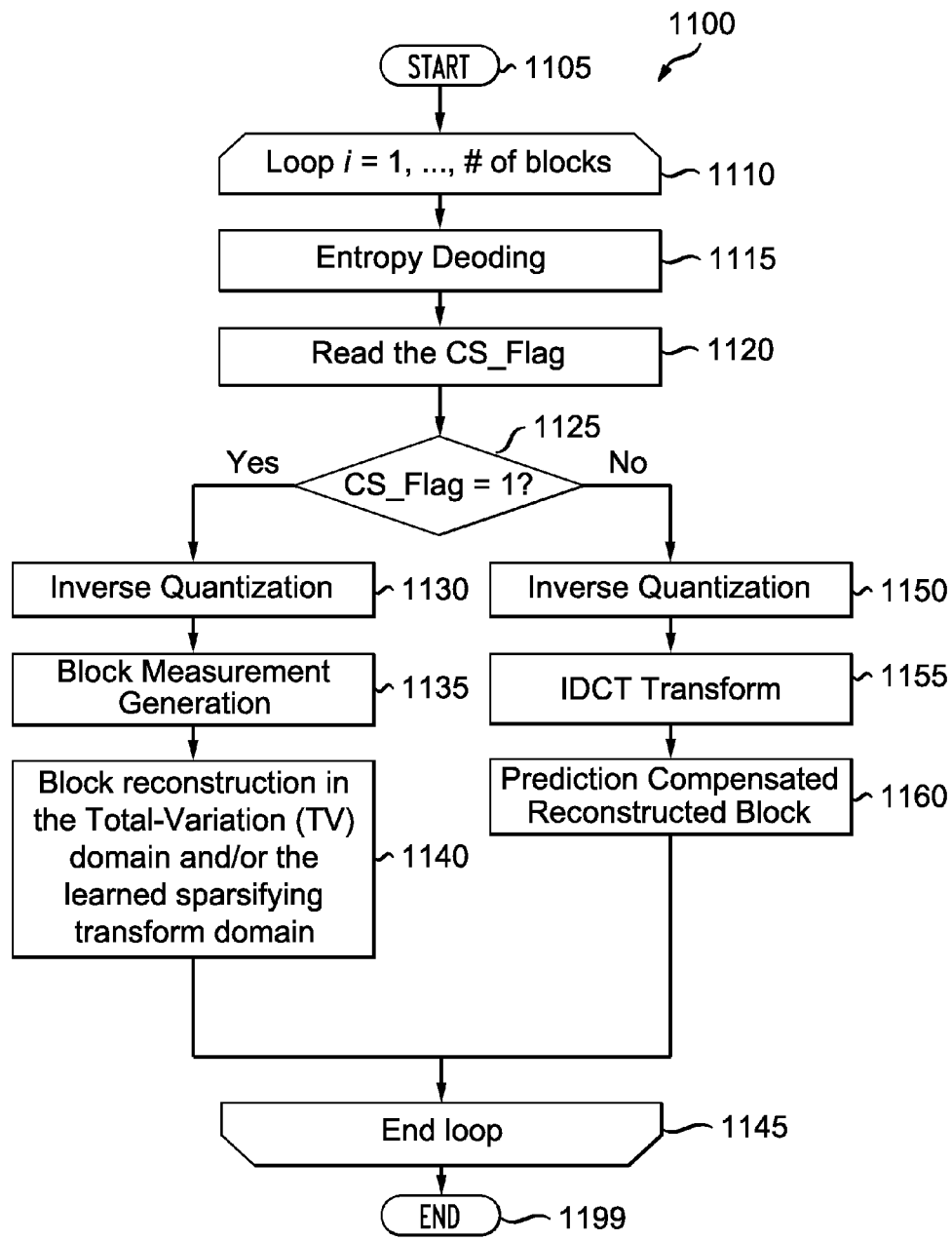
FIG. 11 is a flow diagram showing a method for decoding image data for a picture, in accordance with an embodiment of the present principles.

Turning to FIG. 11, an exemplary method for decoding image data for a picture is indicated generally by the reference numeral 1100. The method 1100 advantageously incorporates a novel compressive sensing mode and a novel block reconstruction in accordance with the present principles. The method 1100 includes a start block 1105 that passes control to a loop limit block 1110. The loop limit block 1110 begins a loop using a variable i having a range from 1, ..., number (#) of blocks, and passes control to a function block 1115. The function block 1115 entropy decodes a bitstream and obtains the quantized transform coefficients of the residue, the Intra/Inter prediction modes, etc., and passes control to a function block 1120. The function block 1120 reads CS_Flag, and passes control to a decision block 1125. The decision block 1125 determines whether or not CS_Flag=1. If so, then control is passed to a function block 1130. Otherwise, control is passed to a function block 1150. The function block 1130 inverse quantizes the quantized transform coefficients to obtain the transform coefficients of the residue, and passes control to a function block 1135. The function block 1135 performs block measurement generation, for example using the method 500 in FIG. 5, and passes control to a function block 1140. The function block 1140 performs a block reconstruction in the Total-Variation (TV) domain and/or the learned sparsifying transform domain by solving the optimization problem described in Equation (16), and passes control to a loop limit 1145. The sparsifying transform is either decoded from the bitstream or trained using the same dataset as used in the encoder. The loop limit block 1145 ends the loop, and passes control to an end block 1199. The function block 1150 inverse quantizes the quantized transform coefficients of the residue to obtain the transform coefficients, and passes control to a function block 1155. The function block 1155 applies an inverse transform (e.g., an inverse discrete cosine transform (IDCT)) to the transform coefficients of the residue to reconstruct the residue, and passes control to a function block 1160. The function block 1160 obtains a prediction compensation reconstructed block by adding the reconstructed residue for the current block to the prediction for the current block, and passes control to the loop limit block 1145.

Figure 12:
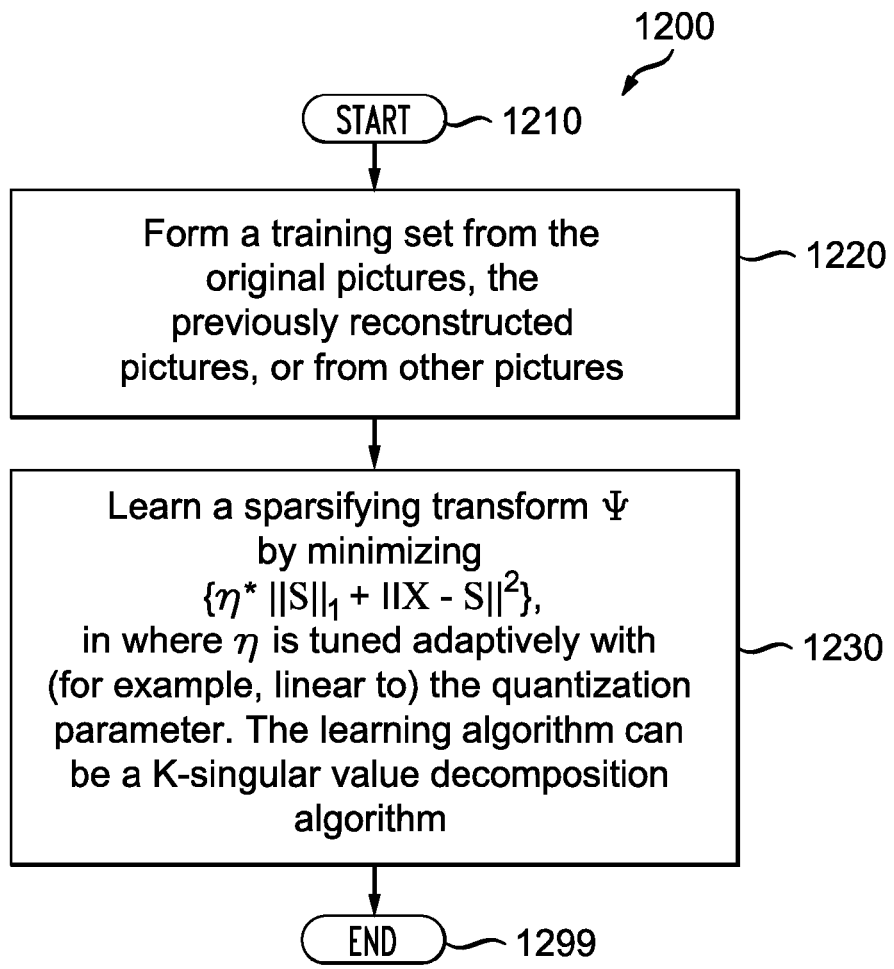
FIG. 12 is a flow diagram showing an exemplary method for forming a training set and learning a sparsifying transform, in accordance with an embodiment of the present principles.

Turning to FIG. 12, an exemplary method for forming a training set and learning a sparsifying transform is indicated generally by the reference numeral 1200. The method 1200 includes a start block 1210 that passes control to a function block 1220. The function block 1220 forms a training set from the original pictures, the previously reconstructed pictures, or from other pictures, and passes control to a function block 1230. The function block 1230 learns a sparsifying transform $\Psi$ by minimizing $\{\eta*\|S\|_1+\|X-\Phi S\|^2\}$, where $\eta$ is tuned adaptively with (e.g., linear to) the quantization parameter, and passes control to an end block 1299. Regarding function block 1230, the learning algorithm can be, for example, but is not limited to, a K-singular value decomposition algorithm.

A description will now be given of some of the many attendant advantages/features of the present invention, some of which have been mentioned above. For example, one advantage/feature is an apparatus having a video encoder for encoding an image block in a picture by determining from a training data set an adaptive transform for transforming a signal capable of representing the image block into zero coefficients and non-zero coefficients, reconstructing the image block in a pixel domain to obtain a reconstructed version of the image block by minimizing a number of the non-zero coefficients in a transform domain corresponding to the transform responsive to information of the signal and a prediction of the image block, and incorporating the reconstructed version of the image block into a coding mode that is absent from any video coding standards and video coding recommendations.

Another advantage/feature is the apparatus having the video encoder as described above, wherein the picture is one of a plurality of original pictures comprised in a video sequence, and the training data set is obtained from at least one of one or more of the plurality of original pictures, one or more respective reconstructed versions of the one or more original pictures, and one or more other pictures in one or more other video sequences.

Still another advantage/feature is the apparatus having the video encoder as described above, wherein a learning algorithm used to determine the transform includes a K-singular value decomposition algorithm.

Yet another advantage/feature is the apparatus having the video encoder as described above, wherein the signal is based on a residue of the image block.

Still yet another advantage/feature is the apparatus having the video encoder as described above, wherein the information of the signal includes transform coefficients of a residue of the image block.

Moreover, another advantage/feature is the apparatus having the video encoder as described above, wherein the information of the signal includes a subset of transform coefficients of a residue of the image block.

Further, another advantage/feature is the apparatus having the video encoder as described above, wherein a signal sparsity corresponding to minimizing the distribution of the non-zero coefficients in the transform domain is measured by a number of transform coefficients when transforming the signal using the transform.

Also, another advantage/feature is the apparatus having the video encoder as described above, wherein a signal sparsity corresponding to minimizing the distribution of the non-zero coefficients in the transform domain is measured by a sum of absolute values of transform coefficients when transforming the signal using the transform.

Additionally, another advantage/feature is the apparatus having the video encoder as described above, wherein the distribution of the non-zero coefficients in the transform domain is minimized using a minimization objective function that is formulated as a weighted sum of a signal sparsity and a signal reconstruction error.

Moreover, another advantage/feature is the apparatus having the video encoder wherein the distribution of the non-zero coefficients in the transform domain is minimized using a minimization objective function that is formulated as a weighted sum of a signal sparsity and a signal reconstruction error as described above, wherein a weight used to obtain the weighted sum is adaptive to a quantization parameter used to quantize a residue of the image block.

Further, another advantage/feature is the apparatus having the video encoder wherein the distribution of the non-zero coefficients in the transform domain is minimized using a minimization objective function that is formulated as a weighted sum of a signal sparsity and a signal reconstruction error as described above, wherein a weight used to obtain the weighted sum is linearly adaptive to a quantization parameter used to quantize a residue of the image block.

Also, another advantage/feature is the apparatus having the video encoder wherein the distribution of the non-zero coefficients in the transform domain is minimized using a minimization objective function that is formulated as a weighted sum of a signal sparsity and a signal reconstruction error as described above, wherein the signal reconstruction error is measured by a mean-squared-error between an original version of the signal and an approximated version of the signal.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder for encoding a block in a picture based on an adaptive transform that is a sparsifying transform determined from a training data set,
wherein the video encoder is configured to reconstruct the block in a pixel domain to obtain a reconstructed block,
wherein the reconstructed block is determined based on the adaptive transform,
wherein the adaptive transform is determined based on a minimization based on a variable $\eta$, a matrix S that represents a matrix of coefficient vectors, and a matrix X that is composed of training data, and a matrix $\Phi$ that is an incoherent sensing matrix, and
wherein the variable $\eta$ is tuned adaptively with a quantization parameter.

2. The apparatus of claim 1, wherein the picture is one of a plurality of original pictures comprised in a video sequence, and the training data set is obtained from at least one of one or more of the plurality of original pictures, one or more respective reconstructed versions of the one or more original pictures, and one or more other pictures in one or more other video sequences.

3. The apparatus of claim 1, wherein the adaptive transform is learned based on a learning algorithm that is a K-singular value decomposition algorithm.

4. The apparatus of claim 1, wherein the reconstructed block is determined based on a residue of the image block.

5. The apparatus of claim 1, wherein the reconstructed block is determined based on transform coefficients of a residue of the block.

6. The apparatus of claim 1, wherein the reconstructed block is determined based on a subset of transform coefficients of a residue of the block.

7. The apparatus of claim 1, wherein a signal sparsity corresponding to minimizing a distribution of non-zero coefficients in a transform domain is measured by a number of transform coefficients when transforming a signal using the adaptive transform.

8. The apparatus of claim 1, wherein a signal sparsity corresponding to minimizing a distribution of non-zero coefficients in a transform domain is measured by a sum of absolute values of transform coefficients when transforming a signal using the adaptive transform.

9. The apparatus of claim 1, wherein a distribution of non-zero coefficients in a transform domain is minimized using a minimization objective function that is formulated as a weighted sum of a signal sparsity and a signal reconstruction error.

10. The apparatus of claim 9, wherein a weight used to obtain the weighted sum is adaptive to a quantization parameter used to quantize a residue of the block.

11. The apparatus of claim 9, wherein a weight used to obtain the weighted sum is linearly adaptive to a quantization parameter used to quantize a residue of the block.

12. In a video encoder, a method, comprising:
encoding a block in a picture based on an adaptive transform that is a sparsifying transform determined from a training set,
wherein the encoding includes reconstructing the block in a pixel domain to obtain a reconstructed block
wherein the reconstructed block is determined based on the adaptive transform,
wherein the adaptive transform is determined based on a minimization based on a variable $\eta$, a matrix S that represents a matrix of coefficient vectors, and a matrix X that is composed of training data, and a matrix $\Phi$ that is an incoherent sensing matrix, and
wherein the variable $\eta$ is tuned adaptively with a quantization parameter.

13. The method of claim 12, wherein the picture is one of a plurality of original pictures comprised in a video sequence, and the training data set is obtained from at least one of one or more of the plurality of original pictures, one or more respective reconstructed versions of the one or more original pictures, and one or more other pictures in one or more other video sequences.

14. The method of claim 12, wherein the adaptive transform is learned based on a learning algorithm that is a K-singular value decomposition algorithm.

15. The method of claim 12, wherein the reconstructed block is determined based on a residue of the image block.

16. The method of claim 12, wherein the reconstructed block is determined based on transform coefficients of a residue of the image block.

17. The method of claim 12, wherein the reconstructed block is determined based on a subset of transform coefficients of a residue of the image block.

18. The method of claim 12, wherein a signal sparsity corresponding to minimizing a distribution of the nonzero coefficients in a transform domain is measured by a number of transform coefficients when transforming a signal using the adaptive transform.

19. The method of claim 12, wherein a signal sparsity corresponding to minimizing a distribution of non-zero coefficients in a transform domain is measured by a sum of absolute values of transform coefficients when transforming a signal using the adaptive transform.

20. The method of claim 12, wherein a distribution of non-zero coefficients in a transform domain is minimized using a minimization objective function that is formulated as a weighted sum of a signal sparsity and a signal reconstruction error.

21. The method of claim 20, wherein a weight used to obtain the weighted sum is adaptive to a quantization parameter used to quantize a residue of the block.

22. The method of claim 20, wherein a weight used to obtain the weighted sum is linearly adaptive to a quantization parameter used to quantize a residue of the block.

23. An apparatus, comprising:
a video decoder for decoding block in a picture based on an adaptive transform that is a sparsifying transform determined from a training set or a bit stream,
wherein the video decoder is configured to reconstruct the block in a pixel domain to obtain a reconstructed block,
wherein the reconstructed block is determined based on the adaptive transform,
wherein the adaptive transform is determined based on a minimization based on a variable $\eta$, a matrix S that represents a matrix of coefficient vectors, and a matrix X that is composed of training data, and a matrix $\Phi$ that is an incoherent sensing matrix, and
wherein the variable $\eta$ is tuned adaptively with a quantization parameter.

24. The apparatus of claim 23, wherein the picture is one of a plurality of reconstructed pictures corresponding to a video sequence, and wherein the training data set is obtained from at least one picture corresponding to the video sequence and comprised in a same training data set available at a corresponding encoder, one or more of the plurality of reconstructed pictures, and one or more other pictures in one or more other video sequences.

25. The apparatus of claim 23, wherein the adaptive transform is learned based on a learning algorithm that is a K-singular value decomposition algorithm.

26. The apparatus of claim 23, wherein the reconstructed block is determined is based on a residue of the image block.

27. The apparatus of claim 23, wherein the reconstructed block is determined comprises transform coefficients of a residue of the block.

28. The apparatus of claim 23, wherein the reconstructed block is determined based on a subset of transform coefficients of a residue of the block.

29. The apparatus of claim 23, wherein a signal sparsity corresponding to minimizing a distribution of non-zero coefficients in a transform domain is measured by a number of transform coefficients when transforming a signal using the adaptive transform.

30. The apparatus of claim 23, wherein a signal sparsity corresponding to minimizing a distribution of non-zero coefficients in a transform domain is measured by a sum of absolute values of transform coefficients when transforming a signal using the adaptive transform.

31. The apparatus of claim 23, wherein a distribution of non-zero coefficients in a transform domain is minimized using a minimization objective function that is formulated as a weighted sum of a signal sparsity and a signal reconstruction error.

32. The apparatus of claim 31, wherein a weight used to obtain the weighted sum is adaptive to a quantization parameter used to quantize a residue of the block.

33. The apparatus of claim 31, wherein a weight used to obtain the weighted sum is linearly adaptive to a quantization parameter used to quantize a residue of the block.

34. In a video decoder, a method, comprising:
decoding an image block in a picture from a bitstream based on an adaptive transform that is a sparsifying transform determined from a training set or a bit stream,
wherein the decoding includes reconstructing the block in a pixel domain to obtain a reconstructed block, wherein the reconstructed block is determined based on the adaptive transform, wherein the adaptive transform is determined based on a minimization based on a variable $\eta$, a matrix S that represents a matrix of coefficient vectors, and a matrix X that is composed of training data, and a matrix $\Phi$ that is an incoherent sensing matrix, and wherein the variable $\eta$ is tuned adaptively with a quantization parameter.

35. The method of claim 34, wherein the picture is one of a plurality of reconstructed pictures corresponding to a video sequence, and wherein the training data set is obtained from at least one picture corresponding to the video sequence and comprised in a same training data set available at a corresponding encoder, one or more of the plurality of reconstructed pictures, and one or more other pictures in one or more other video sequences.

36. The method of claim 34, wherein the adaptive transform is learned based on a learning algorithm that is a K-singular value decomposition algorithm.

37. The method of claim 34, wherein the reconstructed block is determined based on a residue of the image block.

38. The method of claim 34, wherein the reconstructed block is determined based on transform coefficients of a residue of the image block.

39. The method of claim 34, wherein the reconstructed block is determined based on a subset of transform coefficients of a residue of the image block.

40. The method of claim 34, wherein a signal sparsity corresponding to minimizing a distribution of non-zero coefficients in a transform domain is measured by a number of transform coefficients when transforming a signal using the adaptive transform.

41. The method of claim 34, wherein a signal sparsity corresponding to minimizing a distribution of non-zero coefficients in a transform domain is measured by a sum of absolute values of transform coefficients when transforming a signal using the adaptive transform.

42. The method of claim 34, wherein a distribution of non-zero coefficients in a transform domain is minimized using a minimization objective function that is formulated as a weighted sum of a signal sparsity and a signal reconstruction error.

43. The method of claim 42, wherein a weight used to obtain the weighted sum is adaptive to a quantization parameter used to quantize a residue of the block.

44. The method of claim 42, wherein a weight used to obtain the weighted sum is linearly adaptive to a quantization parameter used to quantize a residue of the block.

45. A non-transitory computer readable storage media having video signal data encoded thereupon, comprising:
a block in a picture encoded based on an adaptive transform that is a sparsifying transform determined from a training data set, wherein the block was encoded by reconstructing the block in a pixel domain to obtain a reconstructed block, wherein the reconstructed block is determined based on the adaptive transform, wherein the adaptive transform is determined based on a minimization based on a variable $\eta$, a matrix S that represents a matrix of coefficient vectors, and a matrix X that is composed of training data, and a matrix $\Phi$ that is an incoherent sensing matrix, and wherein the variable $\eta$ is tuned adaptively with a quantization parameter.

* * * * *